Feb. 3, 1959
L. KENNEDY
2,872,078
BEVERAGE DISPENSER
Filed April 29, 1955
2 Sheets-Sheet 1
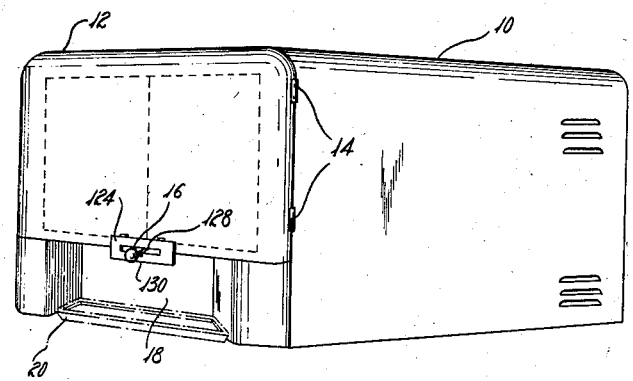
Fig.1
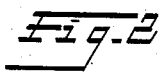
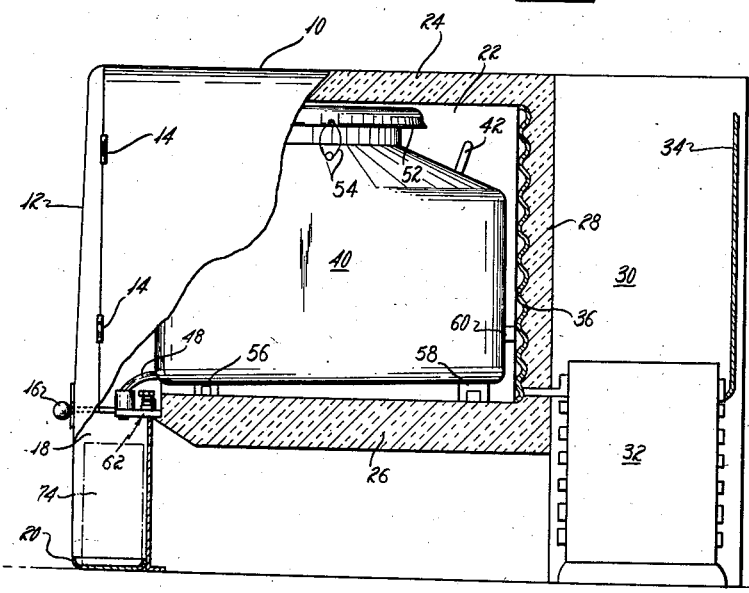
INVENTOR
LEO KENNEDY
BY Strauch, Nolan & Diggins
ATTORNEYS

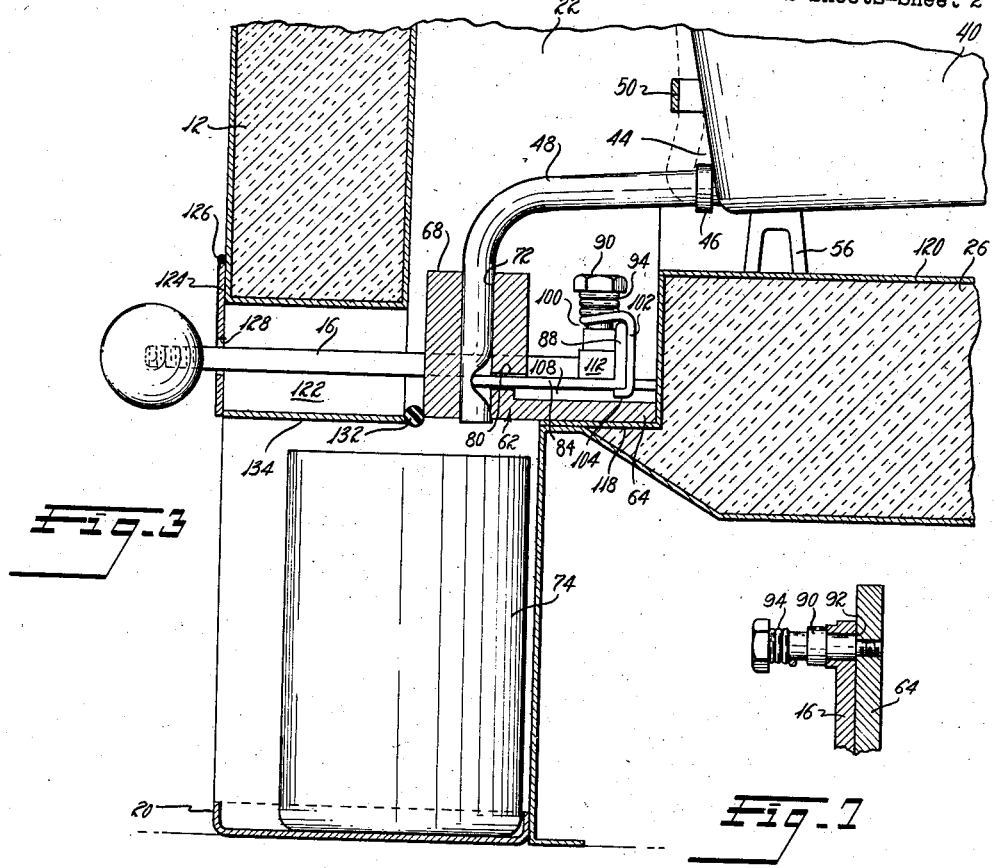

United States Patent Office 2,872,078
Patented Feb. 3, 1959

2,872,078

BEVERAGE DISPENSER

Leo Kennedy, Mount Pleasant, Iowa

Application April 29, 1955, Serial No. 504,914

15 Claims. (Cl. 222—131)

This invention relates to a unit for refrigerating and dispensing liquids from relatively large containers and more particularly relates to a unit for holding and dispensing bulk milk and other beverage products in the home.

Considerable attention has been given to the problem of dispensing milk in a satisfactory sanitary manner in restaurants and other establishments where large volumes of milk are served to the public in small quantities. Primarily the problem involves the elimination of the nuisance and expense of transporting, refrigerating, storing and serving such large volumes of milk and other dairy products from small bottles or containers, each generally containing one serving. Refrigerated cabinets have been widely used containing milk cans which having a discharge tube connectable to an external spigot or valve on the refrigerated compartment and in general several cans of milk are dispensed during a business day with the refrigerating cabinet and valve mechanism being susceptible of cleaning at each change of cans.

While the foregoing milk and dairy product dispensers have been found relatively satisfactory in restaurants and other establishments dispensing large quantities of milk, they are not particularly satisfactory in private homes where the volume of milk dispensed is relatively small. Thus while some of the constructional details and characteristics of restaurant type milk and dairy product dispensers are useful in home units, others are completely unsatisfactory under the different conditions of operation. That is to say, the home milk or dairy product dispensing unit does not dispense high volumes of milk at a high dispensing rate but on the contrary must store milk for a relatively long period of time during which it is withdrawn at a relatively low rate. The bulk milk containers remain in the unit for a longer period of time and special precautions must be taken to insure against spoilage and unsanitary delivery methods. There is no convenient possibility of frequently changing the cans nor is it practical to provide for a daily sterlizing or cleaning of the delivery mechanism. In addition the space and size requirements and the aesthetic considerations of home units are considerably different from those encountered in supplying restaurant needs.

It is accordingly, a primary object of the present invention to provide an economical and attractive appliance which will dispense refrigerated bulk milk and other spoilable fluid food products in a sanitary manner in the home.

It is another object of the invention to provide such a home dispensing unit which utilizes a novel type of valving arrangement to insure complete refrigeration of all of the bulk fluid at all times.

It is another object of the invention to provide such a home type dispenser having a refrigerated valve which utilizes as an essential part thereof one or more disposable flexible tubes which may be delivered as a part of the bulk fluid containers.

It is another object of the invention to provide a home type refrigerated beverage dispenser which is capable of dispensing one or more beverages from a plurality of bulk containers.

It is another object of the invention to provide a home type refrigerated milk dispenser wherein the bulk milk may be stored for a longer period of time than is possible either with restaurant type units or with conventional refrigerator storage of bottled milk.

It is another object of the invention to provide a home type refrigerated beverage dispenser which will add materially to the convenience of the housewife and which will induce and encourage greater milk consumption by adults and more especially by growing children.

It is a further object of the invention to provide a home type milk dispenser which is small enough for counter mounting and which possesses a pleasing and attractive appearance.

It is another object of the invention to provide a home type milk, dairy product and other refrigerated beverage dispenser which utilizes a novel type of selector valve in which the refrigerated product does not come into contact with metal valve elements.

It is another object of the invention to provide a home type bulk beverage dispenser having a refrigerating compartment containing a beverage dispensing valve therein.

It is another object of the invention to provide a home type bulk beverage dispenser having a refrigerating compartment containing a beverage dispensing valve mounted below the level of the floor thereof.

It is another object of the invention to provide a home type bulk beverage dispenser having a refrigerating compartment and having a valve located therein in such a manner as to permit easy insertion and removal of beverage cans without danger of damaging the valve and without the necessity of accurately positioning the cans.

It is still a further object of the invention to provide a home type milk, dairy product or refrigerated beverage dispenser utilizing a valve arrangement which insures that no part of the stored beverage is subjected to room temperatures.

Further objects and advantages will become apparent upon reference to the following specification and claims and appended drawings wherein:

Figure 1 is a perspective view of a home type refrigerated beverage dispensing unit according to the invention;

Figure 2 is a partial vertical cross section of the dispenser of Figure 1;

Figure 3 is a detailed vertical cross section of the valving arrangement of the dispenser;

Figure 4 is a plan view, partly in section, of the valving arrangement;

Figure 5 is a perspective view of a container for use in the dispensing unit of Figure 1;

Figure 6 is a detailed vertical section of the valve unit taken along the line 6—6 of Figure 4; and Figure 7 is a detailed vertical section of the valve unit taken along the line 7—7 of Figure 4.

Referring more particularly to the figures of the drawing there is shown in Figure 1 a home type milk dispensing unit consisting of an insulated cabinet 10 having an access door 12 hinged at 14 and having a dispensing valve actuating lever 16. The portion of the front of the cabinet below the door 12 is recessed at 18 for the reception of glasses or other receptacles and a tray 20 is provided to receive the glasses and to catch any milk drippage or condensate.

Referring to Figure 2, the cabinet 10 consists of an insulated compartment 22 defined by roof 24, floor 26, rear wall 28, a pair of side walls, and the door 12. Each of such walls is of a double surface construction and is filled with a suitable insulating material such as fiber glass. A compartment 30 is provided in the rear of the cabinet for a conventional refrigerating unit consisting of a compressor 32, cooling condenser 34 and cooling coil 36.

The refrigerating compartment 22 is designed to hold two bulk milk containers 38 and 40 of stainless steel or other material of like durability which will comply with the appropriate health regulations. These containers are especially designed to satisfy the space and sanitary valve requirements of a home type unit and are rectangular in shape and of seamless rounded corner construction as shown in Figure 5. Each container has a pair of handles 42 for easy carrying and handling and has a smoothly curved recessed base portion 44 carrying a milk spout 46 to which is attached a disposable rubber or other flexible plastic hose 48, as is best seen in Figure 3. A hose securing strap 50 having its outer end sealed shut is provided across the recess 44 for retaining the hose 48 is a protected crimped closed position during transit of the container as is illustrated in Figure 5. The hose 48 is a conventional milk hose, meeting sanitary regulations, and is attached by the dairyman at the time of filling the container. The container is closed by an umbrella type lid 52 which is sealed to the can by a conventional lead wire seal 54.

The containers 38 and 40 rest upon the floor 26 of the refrigeration compartment on floor racks 56 and 58 which are sized to give the containers a slightly forward tilt in order to insure complete draining. The backs of the containers fit against a suitable bumper 60 so that complete surrounding circulation of cold air is obtained on all sides of the containers.

Referring more particularly to Figures 3 and 4, the hoses 48 extend from the nozzles 46 downwardly through a metal valve block indicated generally at 62 and consisting of a base 64 carrying a pair of hose receiving blocks 66 and 68. The hoses 48 are received snugly in bores 72 in hose blocks 66 and 68 and extend therethrough so as to be in a position to discharge into a glass 74 or other suitable receptacle placed upon the tray 20 within recess 18. The upper surface of the base 64 of the valve body 62 is provided with a pair of parallel guide slots 76 and 78 which extend into hose blocks 66 and 68 as shown at 80 in Figure 3. A pair of more or less pointed shut-off slides 82 and 84 having upstanding rear ends 86 and 88 are slidingly received in the slots 76 and 78 for sealing engagement with hoses 48, as shown in Figure 4. The valve lever 16 is pivotally fastened to the base 64 by means of a bolt 90 which shoulders upon the base 64 at 92 to provide horizontal free pivotal movement for the lever 16. A coil spring 94 having a pair of outwardly extending arms 96 and 98 is received upon a reduced diameter portion 100 of the bolt 90 and the arms 96 and 98 terminate in downwardly bent portions 102 which engage the upturned ends 86 and 88 of shut-off slides 82 and 84. The downwardly bent portions 102 lock beneath the slides at 104 as is best seen in Figure 3. A further pair of easily cleaned concave bottom grooves 106 and 108 is centrally provided within slots 76 and 78 in order to receive the underturned ends 104 of the spring 94. The coil spring 94 constantly biases both arms 96 and 98 forwardly to force the shutoff slides 82 and 84 into bores 72 to collapse and tightly clamp the hoses 48 to prevent liquid flow as is shown in Figures 3 and 4.

The valve lever 16 is provided with a pair of rear lateral arms 110 and 112 which extend substantially normal to the lever 16 and slidably rockably bear against the forward surfaces of upstanding ends 86 and 88 of the shut-off slides 82 and 84. These arms also extend slidably over the top surfaces of slides 82 and 84 and retain those slides in their guide slots, so that when bolt 90 is in place it holds the valve assembly together. When the lever 16 is in an at rest position as shown in full lines in Figure 4 the shut-off slides 82 and 84 are both forced completely forward against hoses 48 by means of the arms of the strong coil spring 94 thereby also maintaining the lever 16 in the central position shown in Figure 4. If the lever 16 is moved to the right as shown by the dotted lines in Figure 4, the right arm 112 positively forces the right shut-off slide 84 to the rear as shown by the dotted lines to permit milk to flow through the right hose 48 into the glass 74. At the same time the other arm 110 moves forwardly as shown by the dotted lines in Figure 4 but without affecting the position of shut-off slide 82 which is maintained in its hose clamping position by means of the arm 96 of spring 94. If the lever 16 is moved in an opposite direction, the left shut-off slide 82 is retracted to allow milk to flow from the left hose 48 in a similar manner while maintaining the right hose 48 clamped in a closed position. The limits of movement of the lever 16 are determined by means of inclined faces 114 and 116 upon hose blocks 66 and 68. Thus the contents of either container may be selectively dispensed.

The valve body 62 is preferably mounted on an off-set portion 118 of the floor 26 somewhat below the level of its upper surface 120 and the lever 16 extends through a cut-out portion 122 of the door 12. A closure flap 124 is hinged to the front of door 12 at 126 to cover the cut-out portion 122. The flap 124 is provided with a horizontal slot 128 which permits actuating movement of the lever 16 and is also provided with a vertical slot 130 permitting the flap 124 to be raised preparatory to opening and closing the door 12. In practice of course the relative sizes of the handle of lever 16 and the door slots are such as to permit free opening of door 12 and flap 124. An insulating strip 132 may be provided between the lower edge 134 of the door 12 and the base 64 in order to seal the front portion of the cabinet in the vicinity of the valve.

With this construction the entire metal valve assembly is within the refrigerated compartment 22 of the cabinet so that it is kept at the temperature of that compartment and there is no danger of spoilage of milk contained in the lower portion of the hoses 48 adjacent the shut-off slides 82 and 84. It will also be seen from Figure 3 that the uppermost portions of the valve assembly, that is the tops of the hose blocks 66 and 68 and the head of the bolt 90, do not rise above the upper surface 120 of the floor 26 so as to minimize the danger of damage to the valve assembly upon insertion or removal of the cans 38 and 40. This recessed valve construction makes it possible to merely slide the can into the cabinet until it strikes the bumper 60 without the necessity of accurately locating the cans in order to enable the valves to operate properly and to prevent leakage. When a can 38 or 40 is placed in the compartment 22 all that is necessary to hook it up for dispensing is to insert the hose 48 down the adjacent bore 72 and snip off the projecting sealed end with a scissors level with the lower end of bore 72.

While the milk in restaurant type bulk milk dispensing machines is normally consumed at such a high rate as to prevent spoilage of milk contained in the lower reaches of the valve mechanism such conditions do not exist in home type units. That is to say, it is not uncommon for a home unit to stand for twenty-four hours between successive withdrawals of milk and under such circumstances it is quite possible that milk in the lower portion of an unrefrigerated valve will spoil, depending upon the ambient temperature. It will be apparent that the home dispensing unit of this invention eliminates this problem by providing a valve mechanism which is not only completely refrigerated but which is so arranged in the cabinet as to permit easy insertion and withdrawal of the cans which need not be accurately centered or located. By using a pair of cans, as shown in the disclosed embodiment of the invention, it is possible to dispense two different fluids as, for instance, milk and cream or milk and orange juice, and to make these beverages easily and attractively available to children.

While restaurant type bulk dispensing units are ordinarily refilled with new cans at least once every twenty-four hours, it is one of the primary purposes of this invention to provide a dispensing unit which can safely store refrigerated beverages such as milk or other dairy products for long periods of time thereby greatly reducing the frequency of milk delivery. The milk is maintained at a temperature of 33° to 36° F., greatly improving its flavor, and considerably increasing the length of time that it may be kept fresh as compared to the keeping time of bottled milk in the average refrigerator. As an example, when using the dispenser of this invention milk deliveries to the average family need be no more frequent than once every 7 to 10 days and milk can be stored without spoilage up to 16 to 20 days. This allows the dairyman to come into personal contact with the ultimate consumer and eliminiates the expense of handling milk through retail stores.

The complete unit is designed to be of a size suitable to set on the work counter of modern kitchens beneath the built-in cupboard or in the case of new construction may be recessed or built-in as a part of the complete kitchen work unit. The dispenser may be connected to a conventional 110 volt 60 cycle power supply and the current drain is relatively low since the cabinet door need not be opened except to withdraw and insert milk containers. Available space in the conventional refrigerator is increased and the problem of children leaving the refrigerator door open for excessive periods of time is eliminated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A dispensing apparatus comprising in combination, an insulated cabinet enclosing a refrigerating compartment, a removable and replaceable fluid container in said compartment, a valve body of high heat conducting material secured within said compartment at an edge thereof and exposed to refrigeration by said compartment, said valve body being spaced from said container, and a flexible hose connected to said container and passing through said valve body and opening to the exterior of said compartment, and means for pinching said hose within said refrigerated valve body.

2. A dispensing apparatus comprising in combination, a cabinet enclosing a refrigerating compartment, a pair of fluid containers in said compartment, a pair of flexible hoses connected to said containers and extending to the exterior of said compartment, and a valve means directly refrigerated by said compartment for controlling the flow of fluid through said hoses, said valve means comprising a valve body having two passages through which extend said hoses, means for normally pinching said hoses to shut off fluid flow, and means for selectively releasing one or the other of said hoses.

3. A dispensing apparatus comprising in combination, a cabinet enclosing a refrigerating compartment, a pair of fluid containers in said compartment, a valve body having the major portion thereof exposed to refrigeration by said compartment, said valve body having a pair of apertures leading out of said compartment, a pair of flexible hoses each connected to one of said containers and each extending through one of said apertures out of said compartment, a valve actuating lever pivotally mounted on said valve body, and means actuated by said lever for selectively permitting and stopping fluid flow through said hoses.

4. A dispensing apparatus comprising in combination, a cabinet enclosing a refrigerating compartment, a pair of fluid containers in said compartment, a valve body having at least its upper area exposed directly to the cooled interior of said compartment, said valve body having a pair of apertures leading out of said compartment, a pair of flexible hoses each connected to one of said containers and each extending through one of said apertures out of said compartment, a valve actuating lever pivotally mounted on said valve body, sliding means mounted on said valve body and associated with each hose passing therethrough so as to be slidable into sealing engagement therewith, said actuating lever being operatively engaged with said sliding means to remove said sliding engagement with one or the other of said hoses upon movement of said lever, and spring means biasing said lever into a neutral position wherein both said hoses are sealed by said sliding means.

5. A dispensing apparatus comprising in combination, a cabinet enclosing a refrigerating compartment, a pair of fluid containers in said compartment, a valve body in said compartment, said valve body having a pair of apertures leading out of said compartment, a pair of flexible hoses each connected to one of said containers and each passing through one of said apertures out of said compartment, a valve actuating lever pivotally mounted on said valve body, a pair of arms connected to said actuating lever, sliding means mounted on said valve body and associated with each hose passing therethrough, and spring means urging said sliding means into contact with said arms and into hose sealing engagement with said hoses, said lever being movable to actuate said arms and remove one or the other sliding means from sealing engagement with its associated hose.

6. A dispensing apparatus comprising in combination, a cabinet enclosing a refrigerating compartment, a pair of fluid containers in said compartment, a valve body in said compartment, said valve body having a pair of apertures leading out of said compartment, a pair of flexible hoses each connected to one of said containers and each extending through one of said apertures out of said compartment, a valve actuating lever pivotally mounted on said valve body, a pair of arms connected to said actuating lever, a pair of slides mounted in grooves in said body for sliding engagement with said hoses, and a spring mounted on the pivot of said lever and having spring arms urging said slides into contact with said arms and into hose sealing engagement with said hoses, said lever being movable to actuate said arms and retract one or the other slides from sealing engagement with its associated hose.

7. A dispensing apparatus as set out in claim 6 wherein said pair of arms are substantially normal to said lever, and said grooves are substantially parallel to one another and to said lever when said lever is in a neutral position.

8. A dispensing apparatus comprising in combination, a cabinet comprising top, bottom and side walls enclosing a refrigerating compartment, a pair of separate removable side by side fluid containers in said compartment, a valve body in said compartment below the upper surface of said bottom wall, said valve body having a pair of apertures leading out of said compartment, a pair of flexible hoses each connected to one of said containers and each extending through one of said apertures out of said compartment, a valve actuating lever pivotally mounted within said compartment on said valve body, and means within said valve body operably connected to said lever for normally clamping both of said hoses shut and operable upon swinging of said lever in one direction or the other to releasably open one or the other of said hoses.

9. A dispensing apparatus comprising in combination, a cabinet comprising top, bottom and side walls enclosing a refrigerating compartment, a pair of fluid containers in said compartment, a valve body in said compartment below the upper surface of said bottom wall, said valve body having a pair of apertures leading out of said compartment, a pair of flexible hoses each connected to one of said containers and each extending through one of said apertures out of said compartment, a valve actuating lever pivotally mounted within said compartment on said valve body, shiftable hose clamping means mounted on said valve body within said compartment below the upper surface of said bottom wall and associated with each hose passing therethrough so as to be shiftable into sealing engagement therewith, said actuating lever being operatively engaged with said shiftable means to remove said shiftable means from sealing engagement with said hoses upon movement of said lever, and spring means biasing said lever into a neutral position wherein both said hoses are sealed by said shiftable means.

10. In a valve assembly, a valve body having a pair of passages for receiving resilient hoses, an operating lever pivoted to said body, a pair of hose clamping members slidably mounted on said body for sliding movement at least partially into said passages, spring means normally urging said hose clamping members into said passages, and means attached to said lever for selectively retracting said hose clamping member from said passages when said lever is oppositely pivoted.

11. In a valve assembly, a valve body having a pair of apertures for receiving resilient hoses, an operating lever pivoted to said body, a pair of slides mounted in grooves in said body for sliding movement at least partially into said apertures, spring means urging said slides into said apertures, and a pair of arms attached to said lever and contacting said slides for retraction out of said apertures.

12. An apparatus as set out in claim 11 wherein said grooves are substantially parallel to one another and to said lever when said lever is in an at rest position, and said arms are substantially normal to said lever.

13. An apparatus as set out in claim 12 wherein said spring means is mounted on the pivot of said lever and comprises outwardly extending arms which contact said slides to bias said slides into said apertures.

14. A perishable liquid dispensing apparatus comprising an insulated refrigerating cabinet enclosing a compartment adapted to removably receive at least one replaceable container of said liquid, said compartment having a bottom wall for supporting said container and an opening in said bottom wall near an edge thereof, a valve body of metal having high heat conductive properties mounted on said bottom wall within said opening and essentially within said compartment so as to have a large area of its surface directly exposed to said compartment to thereby maintain refrigeration of said valve body, means within said valve body providing a passage for a resilient sanitary tube leading from the container through the valve body to open to the exterior of said bottom wall, valve means on said body for normally pinching said tube closed to check flow of liquid therethrough and mechanism including a handle extending through the cabinet so as to be operable exteriorly thereof for manipulating said valve means to permit opening of said tube to dispense said liquid therethrough.

15. In a self-contained home milk dispensing apparatus, a cabinet having insulated walls enclosing a compartment and having means for adequately refrigerating the compartment, said cabinet having an open side and a door closing said open side, means for removably mounting two individual multi-quart cans of milk within said compartment in close side by side relation, each of said containers being of the type having a bottom discharge through a sanitary resilient hose of small diameter, and valve means on said cabinet adjacent the lower edge of the door opening, said valve means being adapted for receiving and normally clamping shut at least one of said hoses and being adapted for controlling dispensing of cold milk from both of said containers, the outlet opening of said clamped hose being directed downwardly, and a set back wall in the lower part of the cabinet defining a glass receiving and filling station recessed rearwardly of the lower edge of said door.

References Cited in the file of this patent

UNITED STATES PATENTS

| | | |
|---|---|---|
| 1,478,289 | Mahoney | Dec. 18, 1923 |
| 2,163,491 | Kauffman | June 20, 1939 |
| 2,417,278 | Van Der Werff | Mar. 11, 1947 |
| 2,433,977 | Bentley | Jan. 6, 1948 |
| 2,448,306 | Gottlieb | Aug. 31, 1948 |
| 2,601,319 | Norris et al. | June 24, 1952 |
| 2,683,556 | Norris et al. | July 13, 1954 |

UNITED STATES PATENT OFFICE

CERTIFICATE OF CORRECTION

Patent No. 2,872,078　　　　　　　　　　　　　　　　February 3, 1959

Leo Kennedy

It is hereby certified that error appears in the printed specification of the above numbered patent requiring correction and that the said Letters Patent should read as corrected below.

Column 5, line 53, after "means" insert -- within said valve body operated by a handle exteriorly of said cabinet --.

Signed and sealed this 2nd day of June 1959.

(SEAL)
Attest:

KARL H. AXLINE
Attesting Officer

ROBERT C. WATSON
Commissioner of Patents